3,185,737
ORTHO ALKYLATION OF PHENOLS
James C. Geddes, Jr., Baton Rouge, La., assignor to Ethyl Corporation, New York, N.Y., a corporation of Virginia
Filed Dec. 19, 1960, Ser. No. 76,725
10 Claims. (Cl. 260—624)

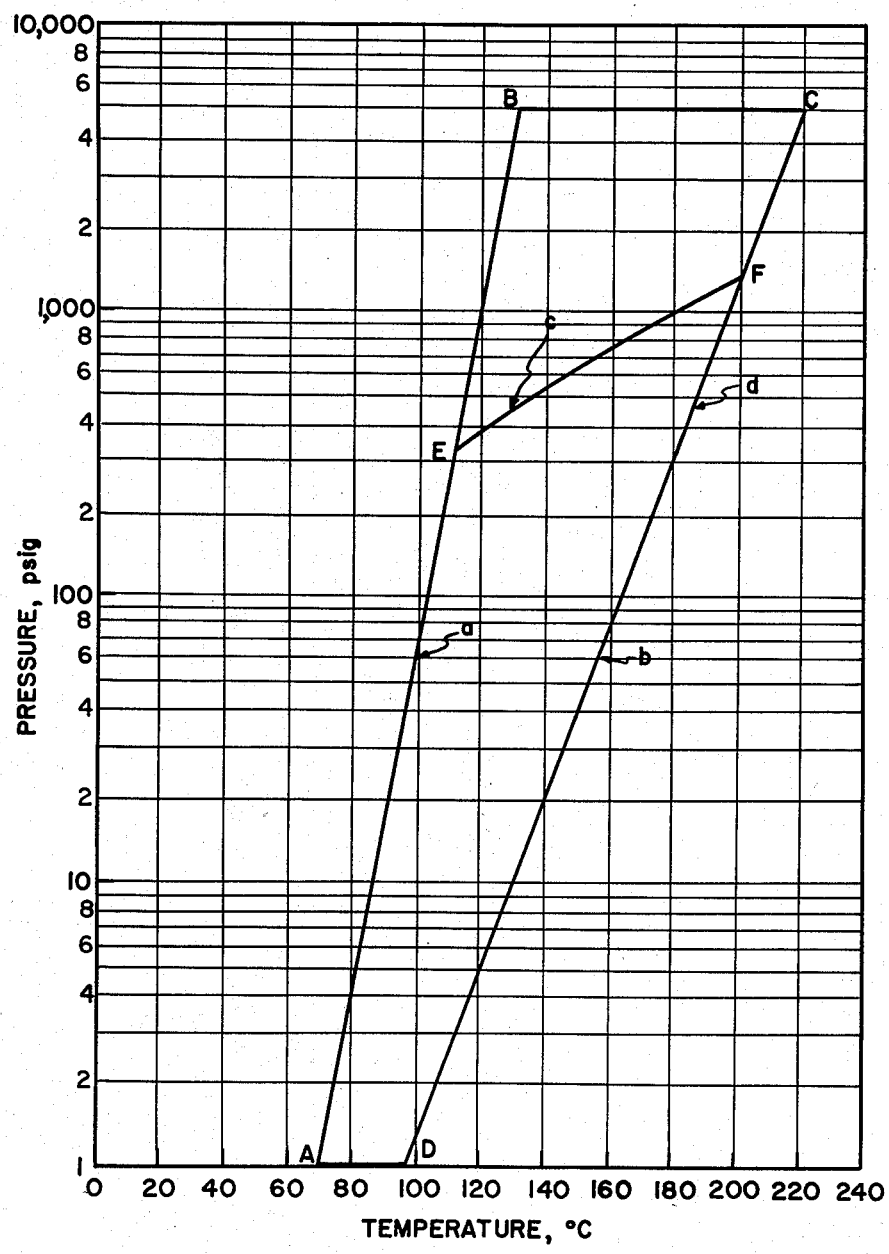

This invention relates to the preparation of ortho-alkyl substituted phenols. More particularly, this invention pertains to marked improvements in the use of aluminum halide catalysts in the preparation of ortho-alkyl substituted phenols. Still more particularly, this invention relates to an especially effective catalytic process for the production of 2,6-di-tert-butyl phenol from phenol and isobutylene.

In U.S. Patent 2,923,745, granted February 2, 1960, a process for the ortho alkylation of phenols using aluminum halide catalysts is taught. Although the process is described in this patent as producing satisfactory yields of 2,6-di-tert-butyl phenol, the disclosed process is not without certain shortcomings. For one thing, the process is limited to reactions conducted at pressures in excess of 100 p.s.i.g. Although such elevated pressures are not uncommon in commercial practice a marked improvement thereover would be the provision of a process which could be conducted very efficiently at pressures of as low as 1 p.s.i.g. Secondly, the operative temperatures for the prior process lie between about 100° C. and 200° C., and a minimum temperature of 150° C. is recommended for the aluminum chloride-catalyzed alkylation of phenol with isobutylene. Again while such elevated temperatures are not uncommon in industrial processes, it would be very desirable if a process could be discovered which can achieve the objectives of the patented process at temperatures significantly lower than those just described. Another limitation on this prior process is the disclosed need for careful analytical control so as to determine those points in the reaction cycle at which satisfactory yields of the desired 2,6-dialkyl phenols are formed relative to the other alkylated phenol products formed by competitive reactions. In other words, this prior process involves the exercise of care not only in analytically following the course of the reaction (e.g. by gas chromatography) but in selecting the appropriate time at which the reaction must be halted lest inordinately high amounts of undesired byproducts be formed. While the yields reported in the foregoing patent are considered satisfactory for commercial operation, nevertheless they are not as high as would be desired for optimum utilization of raw materials and for production of the desired 2,6-di-tert-butyl phenol in the greatest quantity per unit time at the lowest cost. Thus in general, to achieve even the yields described for the prior art process required the observance of a careful interrelationship among reagent concentrations, reaction conditions and reaction time.

Accordingly, an object of this invention is to provide a highly efficient process which is capable of using an aluminum halide catalyst and which is free from the above shortcomings of the prior process. More particularly, an object of this invention is to provide improvements in aluminum halide-isobutylene-phenol reactions for production of 2,6-di-tert-butyl phenol. Other important objects of this invention will become manifestly clear from the ensuing description and claims.

It has now been discovered that by observing certain sharp distinctions over the process taught in the foregoing patent the above and other objects of this invention are accomplished most expeditiously. More specifically, it has been discovered that if throughout substantially the entire alkylation reaction period (a) the pressure is maintained essentially constant, (b) certain pressure-temperature relationships are observed and (c) certain halogen-content levels within the reaction mixture are maintained, 2,6-dialkyl phenols can be prepared in an exceedingly efficient manner in reactions involving isobutylene, certain phenolic compounds described hereafter, and aluminum halide catalysts. By way of example, experiments have shown that yields of 2,6-di-tert-butyl phenol as high as 87 percent in reaction periods as short as 85 minutes are achieved. In fact, the process of this invention will, in times as short as 20 minutes, produce yields of 2,6-di-tert-butyl phenol as high as 81 percent. Even at constant pressures as low as 50 p.s.i.g. and below, yields as high as 77 percent of 2,6-di-tert-butyl phenol result in periods as short as 170 minutes and at temperatures as low as 110° C. And, at temperatures as low as 80° C. and a constant pressure as low as 3 p.s.i.g., 2,6-di-tert-butyl phenol can be produced in yields as high as 76 percent.

The pressure-temperature relationships use in the practice of this invention are best defined by reference to the figure of the drawing. This figure represents a plot of the pressures and corresponding temperatures which are used, inter alia, in effecting the present process. In particular, the ordinate in the figure of the drawing represents the pressure limits within which the process is carried out, these limits ranging from 1 to 5,000 p.s.i.g. In the plot of the figure these pressures are presented in a logarithmic scale. The abscissa constitutes a plot of the reaction temperatures which are used in association with the pressure selected for use during substantially the entire alkylation reaction period. The plot in the figure was constructed by connecting together by means of straight lines 4 specific points, designated A, B, C and D to form an enclosed quadrilateral as shown. The value for these respective points are as follows:

|  | A | B | C | D |
|---|---|---|---|---|
| Pressure, p.s.i.g. | 1 | 5,000 | 5,000 | 1 |
| Temperature, °C. | 70 | 132 | 222 | 98 |

Hence, throughout essentially the entire alkylation reaction period the temperature and pressure limits are as defined by the foregoing quadrilateral. The preferred temperature-pressure conditions for use in the practice of this invention are as defined by the area A E F D of the figure, point E representing a pressure of 330 p.s.i.g. and a temperature of 1120 C. and point F a pressure of 1320 p.s.i.g. and a temperature of 203° C. Line EF is an arc constructed so as to join the foregoing two points and to pass through the following intermediate points which represent the vapor pressure of pure isobutylene as a function of temperature:

| Temperature, (°C.): | Pressure, (p.s.i.g.) |
|---|---|
| 120 | 375 |
| 130 | 445 |
| 140 | 530 |
| 144.7 | 565 |
| 160 | 740 |
| 170 | 855 |
| 180 | 990 |
| 190 | 1140 |

Operation within the limits defined by A E F D is preferred since within these limits it is unnecessary to employ an inert diluent or atmosphere.

Thus insofar as the pressure-temperature relationships pursuant to this invention are concerned recourse is had to an essentially constant pressure for use throughout the entire alkylation reaction, the pressure being selected so as to be between about 1 and about 5,000 p.s.i.g. Once this pressure is selected the temperature which is maintained throughout substantially the entire reaction period is determined by the points of intersection of a horizontal line along the pressure selected and lines AB and CD of the figure. In the preferred operation referred to above vis-a-vis staying below arc EF, the temperature limits are defined by the points of intersection between a horizontal line along the pressure selected and line AEF and line FD of figure. To illustrate, if it is desired to operate at a pressure of 60 p.s.i.g. the temperature may range throughout the entire alkylation reaction from 100° C. (point "a" on the figure) to 158° C. (point "b" on the figure). By the same token in conducting the preferred embodiment of this invention referred to above at a pressure of 445 p.s.i.g. the temperature may range from 130° C. (point "c" on the figure) to 187° C. (point "d" on the figure). It is seen that in the foregoing two illustrative examples the temperature limits are defined by the points of intersection between a horizontal line along the pressure selected and, in the first instance, lines AB and CD, and in the second instance, lines AEF and FD. When it is desired to operate under conditions defined by area EBCF an inert diluent or inert gas should be used in order to exceed the normal vapor pressure of the pure isobutylene.

A very important feature of this invention is that the present process is conducted at an essentially constant pressure throughout essentially the entire alkylation reaction period. By this is meant that the reaction zone is kept under an essentially uniform pressure within the limits defined above, the maximum pressure deviation from this particular pressure being no greater than ±50 p.s.i.g. As will be brought out in more detail hereinafter it has been found that the process as taught in U.S. 2,923,745 cannot be successfully applied to operation at such essentially constant pressures because exceedingly poor yields of the desired 2,6-dialkyl phenol are formed thereby. As a matter of fact, when the process taught in the foregoing patent was applied to operation at a constant pressure of 350 p.s.i.g. in an operation using phenol, isobutylene and aluminum chloride no detectable 2,6-di-tert-butyl phenol was formed at any stage of the reaction. By the same token when this procedure was repeated at a constant pressure of 230 p.s.i.g. it was found that throughout the entire reaction period the yield of 2,6-di-tert-butyl phenol never exceeded 3 percent.

Another very important feature of this invention, then, is that the total content of halogen as organic halides, hydrogen halides or mixtures thereof must be maintained throughout the alkylation reaction period below about 0.02 (and preferably below about 0.01) gram atom per gram mole of the phenolic reactant employed in the process. Thus whereas U.S. 2,923,745 teaches the desirability of adding comparatively small amounts of halogenated organic compounds or hydrogen halides to the system containing the aluminum halide catalyst, it has been found that in the present process such additions must not be made and, in fact, that the total amount of organic halogen and/or hydrogen halide in the system must be maintained below about 0.02 gram atom of halogen per gram mole of the phenol reactant so that the foregoing constant pressure operation under the temperature-pressure conditions can effect such excellent yields of the desired 2,6-di-tert-butyl phenol product.

The reactants used in the present process are isobutylene and a phenol in which the para position and at least one of the ortho positions carry no substituent other than hydrogen. The remaining ortho position may be occupied with a lower alkyl group (e.g., methyl, ethyl, propyl, isopropyl, butyl, isobutyl, sec-butyl or tert-butyl) or a hydrogen atom. Furthermore, meta substituted phenols such as meta-cresol, meta-ethyl phenol, 3,5-dimethyl phenol, meta-amino phenol, meta-nitro phenol, and the like can be used. The use of phenol itself is the most preferred embodiment of this invention since this enables the preparation of 2,6-di-tert-butyl phenol in very high yield and purity. This particular dialkylated phenol is of tremendous value in the chemical and allied arts, e.g., as an antioxidant and as a precursor for numerous highly efficient antioxidants such as 4,4'-methylene, bis-2,6-di-tert-butyl phenol, a superlative antioxidant for lubricating oils and the like (see U.S. 2,807,653 and 2,944,086). Other preferred phenolic reactants are ortho cresol and ortho tert-butyl phenol. In the first instance, the product produced by this invention is 2-methyl-6-tert-butyl phenol which finds important uses in the art as an antioxidant and as a precursor for important antioxidant chemicals. When ortho tert-butyl phenol is used 2,6-di-tert-butyl phenol is formed although in this instance reprocessing is involved since ortho tert-butyl phenol is not readily available, except as a product of phenol ortho alkylation reactions.

The aluminum halide catalyst used in this invention generally results from the introduction into the reaction system of aluminum chloride, aluminum fluoride, aluminum bromide, aluminum iodide, aluminum chlorobromide or analogous chemicals. However, effective use can be made if desired of preformed phenoxy derivatives of these aluminum halides such as phenoxy aluminum dichloride, diphenoxy aluminum chloride, etc. The important feature, however, in this respect is that the total content of organic halogen plus hydrogen halide in the reaction zone during the alkylation reaction itself must be maintained below about 0.02 gram atom per gram mole of phenol reactant. In other words, the total content of halogen in the reaction zone in the form of organic halides (e.g., tert-butyl chloride, amyl chloride, phenoxy aluminum dichloride, diphenoxy aluminum chloride, etc.) or hydrogen halides (e.g., HCl, HBr, etc.), or both, must not exceed this amount. It has been found, however, that halogen in the form of such inorganic halides such as sodium chloride, potassium chloride, etc., is not detrimental to the process.

For best results the phenol reactant and catalyst are introduced into the alkylation reaction system in relative proportions such that there are from about 5 to about 100 gram moles of the phenol per gram atom of aluminum. However, concentrations of the aluminum catalyst corresponding to as low as 1 gram atom of aluminum per 200 gram moles of the phenol can be used. In this instance the reaction rate is relatively slow and therefore it is desirable to operate at the higher temperature conditions defined by area ABCD of the figure.

In conducting the present process it is advantageous from the standpoint of maximum yields of 2,6-dialkyl phenol product to use the lower temperatures defined by the figure with respect to the particular pressure employed. By the same token it is preferable, as indicated above, to maintain the halogen content (organic halide and/or hydrogen halide) below about 0.01 gram atom per gram mole of phenol; especially excellent yields occurring when this content is as low as 0.005. From the standpoint of optimum reaction rates, it is preferable to use the higher temperatures defined by the figure. Furthermore, at the higher temperatures the amount of the aluminum catalyst is preferably in the range of about 1 gram atom of aluminum per each 50 to 200 gram moles of phenolic reactant. On the other hand, at the lower temperatures (e.g. 70–120° C.) the catalyst concentration is preferably in the range of about 1 gram atom of aluminum per each 5 to 50 gram moles of the phenol reactant.

An especially preferred embodiment of this invention is the manufacture of 2,6-di-tert-butyl phenol by heating a mixture of an aluminum halide (most preferably aluminum chloride) and phenol to a temperature of at least about 50° C. (most preferably at least 90° C.) sufficient to cause the evolution of hydrogen halide. Thereupon contact is established between the resulting phenol mixture and isobutylene in a reaction zone maintained at an essentially constant pressure within the range of 1 to 5,000 p.s.i.g. and at a temperature defined as described above with reference to the figure. Again, it is essential that the reaction zone contain not more than 0.02 gram atom of halogen per mole of phenol, where the halogen is in the form of one or more organic halides, hydrogen halides, or mixtures thereof. 2,6-di-tert-butyl phenol is then recovered in excellent yield from the reaction product so-formed.

A variety of procedures are available for use in recovering and isolating the desired 2,6-dialkyl phenol from the reaction mixture. Fractional distillation procedures are greatly preferred for most commercial applications although recourse may be had, if desired, to solvent extraction or other similar methods. Therefore, upon completion of the alkylation reaction it is desirable to contact the reaction mixture with water, an aqueous caustic solution (e.g. aqueous sodium hydroxide), or an aqueous mineral acid (e.g. hydrochloric acid). Thereupon a separation is effected as between the organic phase and the aqueous phase and then the organic phase is subjected to fractional distillation or related separation procedure.

The alkylation reaction time used in the process of this invention is not critical and can range from a matter of a few minutes up to several hours or more depending upon the type of reaction equipment available and the type of operating procedure selected.

The following experimental runs illustrate the process of this invention and the exceedingly beneficial results flowing therefrom.

EXAMPLE I

A series of alkylation runs were conducted employing a heated reaction vessel equipped with means for introducing and withdrawing chemical reagents, heating means and means for effecting agitation for the reaction mixture. In each case the aluminum halide catalyst is used under conditions such that throughout the entire alkylation reaction period the total content of organic halides or hydrogen halides, or both, does not exceed 0.02 gram atom of halogen per gram mole of the phenolic reactant. In particular, the system employed in these runs involves aluminum chloride, phenol and isobutylene. In each run the pressure is maintained essentially constant throughout the indicated reaction period and the temperature is maintained within the area defined by the figure of the drawing. Upon completion of the reaction, the 2,6-di-tert-butyl phenol content in the reaction mixture is determined by means of vapor phase chromatography.

The particular reaction conditions used and the results thereby obtained are set forth in Table 1.

Table 1.—*Process of this invention applied to the production of 2,6-di-tert-butyl phenol*

| Run No. | Temp. (° C.) | Pressure (p.s.i.g.) | Catalyst conc. (moles phenol/gram atom Al) | Time (min.) | Yield [1] (mole percentage) |
|---|---|---|---|---|---|
| 1 | 110 | 50 | 60/1 | 180 | 78 |
| 2 | 110 | 85 | 60/1 | 170 | 77 |
| 3 | 110 | 50 | 30/1 | 180 | 77 |
| 4 | 110 | 85 | 30/1 | 85 | 87 |
| 5 | 110 | 85 | 30/1 | 105 | 76 |
| 6 | 110 | 85 | 30/1 | 150 | 80 |
| 7 | 110 | 150 | 30/1 | 90 | 76 |
| 8 | 140 | 210 | 60/1 | 45 | 79 |
| 9 | 140 | 210 | 60/1 | 35 | 82 |
| 10 | 140 | 210 | 60/1 | 32 | 79 |
| 11 | 140 | 210 | 60/1 | 30 | 72 |
| 12 | 140 | 292 | 60/1 | 50 | 84 |
| 13 | 140 | 35 | 30/1 | 70 | <50 |
| 14 | 140 | 65 | 30/1 | 55 | 58 |
| 15 | 140 | 172 | 30/1 | 35 | 76 |
| 16 | 140 | 172 | 30/1 | 60 | 79 |
| 17 | 140 | 210 | 30/1 | 28 | 76 |
| 18 | 140 | 210 | 30/1 | 25 | 77 |
| 19 | 140 | 210 | 30/1 | 25 | 77 |
| 20 | 140 | 210 | 30/1 | 20 | 81 |
| 21 | 140 | 210 | 30/1 | 25 | 77 |
| 22 | 140 | 292 | 30/1 | 45 | 79 |
| 23 | 140 | 385 | 30/1 | 75 | 78 |
| 24 | 140 | 385 | 30/1 | 73 | 77 |
| 25 | 140 | 65 | 15/1 | 60 | 77 |
| 26 | 140 | 172 | 15/1 | 30 | 76 |
| 27 | 140 | 210 | 15/1 | 22 | 75 |
| 28 | 140 | 330 | 15/1 | 15 | 75 |
| 29 | 140 | 415 | 15/1 | 35 | 75 |
| 30 | 140 | 415 | 5/1 | 90 | 62 |
| 31 | 160 | 133 | 30/1 | 30 | 48 |
| 32 | 160 | 350 | 30/1 | 20 | 69 |
| 33 | 180 | 350 | 30/1 | 13 | 42 |
| 34 | 180 | 500 | 30/1 | 13 | 48 |

[1] 2,6-di-tert-butyl phenol.

COMPARATIVE EXAMPLE A

Another series of experiments identical with those described in the previous example were carried out. In this case the temperature-pressure relationships described in the figure of the drawing, however, were not adhered to—i.e. the temperatures and pressures did not fall on or within the area defined by points A, B, C, D. The results of these experiments are shown in Table 2.

Table 2.—*Process not of this invention applied to the production of 2,6-di-tert-butyl phenol*

| Run No. | Temp. (0° C.) | Pressure (p.s.i.g.) | Catalyst conc. (moles phenol/gram atom Al) | Total reaction time (min.) | Maximum yield [1] (mole percentage) |
|---|---|---|---|---|---|
| 35 | 160 | 35 | 30/1 | 90 | 30 ( 40) |
| 36 | 180 | 240 | 30/1 | 50 | 31 ( 10) |
| 37 | 200 | 350 | 30/1 | 50 | 18 ( 4) |
| 38 | 210 | 500 | 30/1 | 25 | 16 ( 13) |
| 39 | 250 | 350 | 30/1 | 50 | 5 ( 2) |
| 40 | 260 | 500 | 30/1 | 30 | 4 ( 3) |
| 41 | 80 | 170 | 15/1 | 130 | 4 (120) |

[1] 2,6-di-tert-butyl phenol. Figure in parenthesis shows the time during the reaction at which the maximum yield was achieved.

By comparing the results shown in Table 1 with those shown in Table 2 it is seen that the temperature-pressure relationships defined by the figure of the drawing are important in achieving the excellent results characterizing this invention.

COMPARATIVE EXAMPLE B

In these runs the aluminum chloride catalyst and phenol were charged into the reaction vessel which was then sealed, heated and pressurized very rapidly with isobutylene. During the course of the entire reaction the pressure was maintained essentially constant by continuous isobutylene feed but in all other respects the process was conducted in the manner taught in U.S. 2,923,745. Periodically during the course of the reaction analyses were made of reaction samples using gas chromatography to determine the nature and quantity of each component therein. The particular reaction conditions used and results obtained thereby are set forth in Table 3.

Table 3.—*Process not of this invention—Attempted production of 2,6-di-tert-butyl phenol*

| Run No. | Temp. (0° C.) | Pressure (p.s.i.g.) | Catalyst conc. (moles phenol/ gram atom Al) | Total reaction time (min.) | Maximum yield [1] (mole percentage) |
|---|---|---|---|---|---|
| 42 | 150-212 | 350 | 30/1 | 29 | Nil (at all times). |
| 43 | 115-176 | 230 | 30/1 | >22 | <3 (at all times). |
| 44 | 140 | 260±15 | 30/1 | 107 | <4 (at all times). |

[1] 2,6-di-tert-butyl phenol.

It will be seen from the data presented in Table 3 that when the process taught in U.S. 2,923,745 was applied to essentially constant pressure operations the yields of 2,6-di-tert-butyl phenol were pathetic. Furthermore, in each instance para alkylation of the phenol was by far the predominant reaction. Thus in Run 42 the product distribution in the reaction mixture after 8 minutes of operation in terms of mole percentages was Ortho-tert-butyl phenol _____ 1
Para-tert-butyl phenol _____ 20
2,4-di-tert-butyl phenol _____ 68
2,4,6-tri-tert-butyl phenol _____ 11

The only significant change which occurred thereafter was that the content of 2,4,6-tri-tert-butyl phenol increased while the content of para-tert-butyl phenol decreased. Similarly, in Run 43 the product distribution after 12 minutes of operation was Ortho-tert-butyl phenol _____ 2
Para-tert-butyl phenol _____ 3
2,4,-di-tert-butyl phenol _____ 15
2,4,6-tri-tert-butyl phenol _____ 54
Phenol _____ 26

Thereafter there was a sharp increase in the concentration of 2,4,6-tri-tert-butyl phenol and a corresponding decrease in the content of both phenol and 2,4-di-tert-butyl phenol. The product distribution for Run 44 at various stages during the reaction was as shown in Table 4.

Table 4.—*Process not of this invention—Product distribution after various periods of operation (5–107 minutes)*

| | Product distribution, mole percentages | | | | | |
|---|---|---|---|---|---|---|
| Minutes | 5 | 12 | 17 | 25 | 45 | 107 |
| Phenolic component: | | | | | | |
| 2,4,6-tri-tert-butyl phenol | 29 | 91 | 91 | 94 | 89 | 66 |
| 2,4-di-tert-butyl phenol | 54 | 4 | 4 | 5 | 8 | 31 |
| 2,6-di-tert-butyl phenol | 2 | 4 | 1 | 0 | 0 | 0 |
| Ortho-tert-butyl phenol | 4 | 0 | 0 | 0 | 0 | 0 |
| Para-tert-butyl phenol | 1 | 2 | 2 | 2 | 1 | 2 |
| Phenol | 9 | 1 | 0 | 0 | 0 | 0 |

While this invention has been described with particular reference to the use of aluminum halide catalysts it will be understood that the principles of operation as herein disclosed can be applied with equal success to the use of preformed aluminum phenoxide catalysts such as aluminum triphenoxide. As before stated, the use of catalysts formed from aluminum chloride is most advantageous, particularly from the standpoint of availability and low cost of the raw material.

Inert diluents which may be used in effecting the process of this invention include paraffins, cyclo-paraffins and aromatic hydrocarbons as these materials are not only inert but compatible with the components of the reaction system. When a solvent is used it is preferable to employ relatively low boiling mononuclear aromatic hydrocarbons such as xylene, ethyl benzene, mesitylene and especially toluene, since these materials are very easily separated from the desired 2,6-di-tert-butyl phenol product.

Inert atmospheres which may be used in the practice of this invention are typified by the inert gases such as nitrogen, argon, helium, krypton or the gaseous paraffinic hydrocarbons such as the butanes.

The amount of isobutylene used in the process of this invention is not critical. Generally speaking, it is preferred to use from 2 to about 5 moles thereof per each mole of phenolic reactant subjected to the process. However, if desired, as much as 6 to 8 moles of isobutylene per mole of phenol can be used. Conversely, a ratio of as low as about 1 mole of isobutylene per mole of phenol can be used, especially when using the lower temperatures or when using a mono-ortho-alkylated phenol as the reactant.

I claim:
1. A reaction involving alkylation of a phenol having a replaceable hydrogen atom on the carbon atom para to the hydroxyl group, a replaceable hydrogen atom on one of the carbon atoms ortho to the hydroxyl group, and on the other carbon atom ortho to the hydroxyl group a radical selected from the group consisting of a replaceable hydrogen atom and an alkyl group having up to 4 carbon atoms with isobutylenes and an aluminum halide catalyst for the production of 2,6-dialkyl phenols; the improvement whereby throughout substantially the entire alkylation reaction period
   (1) the reaction system is maintained at an essentially constant pressure within the limits of 1 to 5,000 p.s.i.g.,
   (2) the temperature of the reaction mixture is maintained with the temperature limits defined by the points of intersection of a horizontal line along the pressure selected and the area defined by lines AB and CD of the figure, and
   (3) the total content of halogen as a material in the form of organic halides, hydrogen halides, and mixtures thereof is maintained below about 0.02 gram atom per gram mole of said phenol reactant.

2. The process of claim 1 wherein said temperature limits are defined by the points of intersection between a horizontal line along the pressure selected and the area defined by line AEF and line FD of the figure.

3. The process of claim 1 wherein said content of halogen is maintained below about 0.01 gram atom per gram mole of said phenol reactant.

4. A reaction involving alkylation of a phenol having a replaceable hydrogen atom on the carbon atom para to the hydroxyl group, a replaceable hydrogen atom on one of the carbon atoms ortho to the hydroxyl group, and on the other carbon atom ortho to the hydroxyl group a radical selected from the group consisting of a replaceable hydrogen atom and an alkyl group having up to 4 carbon atoms with isobutylene and an aluminum chloride catalyst for the production of 2,6-dialkyl phenols; the improvement whereby throughout substantially the entire alkylation reaction period
   (1) the reaction system is maintained at an essentially constant pressure within the limits of 1 to 5,000 p.s.i.g.,
   (2) the temperature of the reaction mixture is maintained within the temperature limits defined by the points of intersection of a horizontal line along the pressure selected and the area defined by lines AB and CD of the figure, and
   (3) the total content of halogen as a material in the form of organic chlorides, hydrogen chloride, and mixtures thereof is maintained below about 0.02 gram atom per gram mole of said phenol reactant.

5. In a process for the production of 2,6-di-tert-butyl phenol by alkylating phenol with isobutylene and an aluminum halide catalyst, the improvement whereby throughout substantially the entire alkylation reaction period
   (1) the reaction system is maintained at an essentially constant pressure within the limits of 1 to 5,000 p.s.i.g., (2) the temperature of the reaction mixture is maintained within the temperature limits defined by the points of intersection of a horizontal line along the pressure selected and the area defined by lines AB and CD of the figure, and
(3) the total content of halogen as a material in the form of organic halides, hydrogen halides, and mixtures thereof is maintained below about 0.02 gram atom per gram mole of said phenol reactant.

6. The process of claim 5 wherein said temperature limits are defined by the points of intersection between a horizontal line along the pressure selected and the area defined by line AEF and line FD of the figure.

7. A reaction involving alkylation of a phenol with isobutylene and an aluminum chloride catalyst for the production of 2,6-di-tert-butyl phenol, the improvement whereby throughout substantially the entire alkylation reaction period
  (1) the reaction system is maintained at an essentially constant pressure within the limits of 1 to 5,000 p.s.i.g.,
  (2) the temperature of the reaction mixture is maintained within the temperature limits defined by the points of intersection of a horizontal line along the pressure selected and the area defined by lines AB and CD of the figure, and
  (3) the total content of chlorine as a material in the form of organic chlorides, hydrogen chloride and mixtures thereof is maintained below about 0.02 gram atom per gram mole of said phenol reactant.

8. A reaction involving alkylation of a phenol with isobutylene for the manufacture of 2,6-di-tert-butyl phenol characterized by
  (1) heating a mixture of an aluminum halide and phenol to a temperature of at least about 50° C. sufficient to cause the evolution of hydrogen halide,
  (2) establishing contact between the resultant phenol mixture and isobutylene in a reaction zone continuously maintained at an essentially constant pressure within the range of 1 to 5,000 p.s.i.g. and at a temperature within the range defined by the points of intersection of a horizontal line along the pressure selected and the area defined by lines AB and CD of the figure, said reaction zone containing per mole of phenol not more than about 0.01 gram atom of halogen as a material in the form of organic halides, hydrogen halides, and mixtures thereof, and
  (3) recovering 2,6-di-tert-butyl phenol from the reaction product so-formed.

9. The process of claim 8 wherein said temperature is defined by the points of intersection between a horizontal line along the pressure selected and the area defined by line AEF and line FD of the figure.

10. The process of claim 8 wherein said aluminum halide is aluminum chloride and said temperature is defined by the points of intersection between a horizontal line along the pressure selected and the area defined by line AEF and line FD of the figure.

References Cited by the Examiner
UNITED STATES PATENTS

| | | | |
|---|---|---|---|
| 2,831,898 | 4/58 | Ecke et al. | 260—624 |
| 2,923,745 | 2/60 | Buls et al. | 260—624 |

LEON ZITVER, *Primary Examiner.*

CHARLES B. PARKER, *Examiner.*